UNITED STATES PATENT OFFICE.

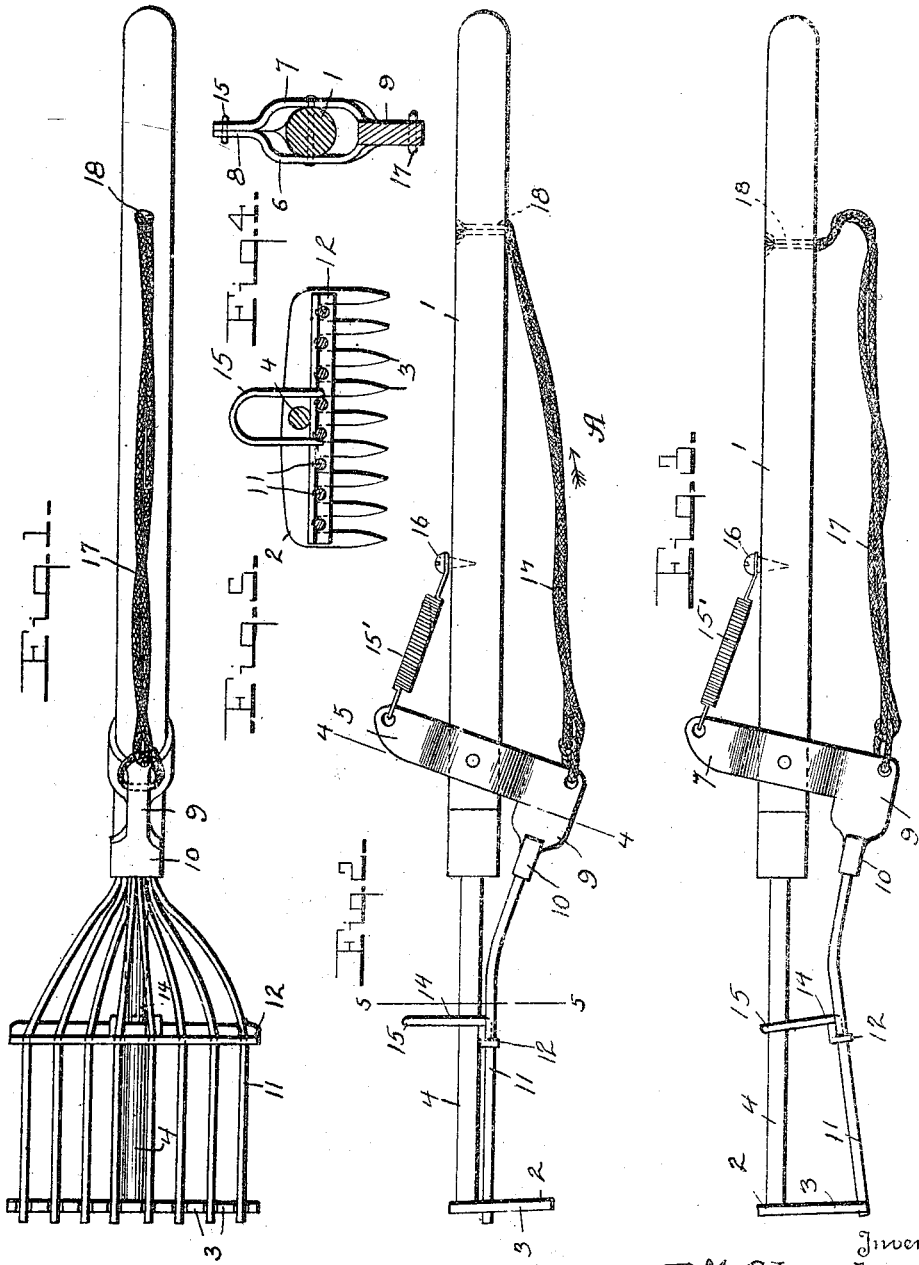

ENOS M. CLOUGH, OF LAKEPORT, NEW HAMPSHIRE.

RAKE.

1,168,165.   Specification of Letters Patent.   Patented Jan. 11, 1916.

Application filed September 14, 1915. Serial No. 50,673.

*To all whom it may concern:*

Be it known that I, ENOS M. CLOUGH, a citizen of the United States, residing at Lakeport, in the county of Belknap and State of New Hampshire, have invented certain new and useful Improvements in Rakes; and I do hereby declare the following to be a full, clear, and exact description of the invention, such as will enable others skilled in the art to which it appertains to make and use the same.

This invention relates to rakes, and the primary object of the invention is to provide an attachment for rakes of ordinary construction, by means of which leaves, grass, or the like, which might cling to the teeth of the rake head, may be quickly and efficiently removed therefrom.

Another object of this invention is to provide an attachment for rakes, as specified, which includes a pivotally supported lever carried by the handle of the rake, and further to connect to the lever, a plurality of spaced tines, which have their outer ends positioned between the teeth of the rake head, for removing leaves or the like from the teeth upon pivotal movement of the lever.

Other objects of the invention are to provide means for manually operating the lever from the hand engaging section of the handle, for moving the tines along the edges of the rake teeth, and also means for automatically moving or returning the tines to an inoperative position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved rake, Fig. 2 is a side elevation of the rake, showing the tines in an inoperative position, Fig. 3 is a side elevation of the rake, showing the tines operated, Fig. 4 is a cross section on the line 4—4 of Fig. 2, and Fig. 5 is a cross section on the line 5—5 of Fig. 2.

Referring more particularly to the drawings, 1 designates the handle of a rake, which has a rake head 2 mounted upon one end of the same. The rake head 2 is constructed in the ordinary manner, being provided with a plurality of downwardly extending spaced raking teeth 3. The handle 1 has a rod 4 formed upon its outer end, which is connected to the head 2 of the rake.

The handle 1 of the rake has a lever 5 pivotally connected thereto, adjacent to the outer or lower end of the handle. The lever 5 is constructed of a pair of plates 6 and 7, which have their upper ends bent and lying in facial abutment with each other, as is shown at 8. The plates 6 and 7 are bent intermediate of their ends, to form a space for receiving the handle 1 of the rake. The lower ends of the plates 6 and 7 are spaced from each other and have positioned therebetween a head 9. The head 9 has a section 10 formed thereon, and extending transversely to the section of the head which is inserted between the lower ends of the plates 7 and 8. The head 10 has a plurality of tines 11 secured thereto, which extend outwardly therefrom, and are braced intermediate their ends by means of a cross brace or bar 12. The tines 11 extend outwardly from the cross brace or bar 12, substantially parallel to each other, and in spaced relation to each other, as is clearly shown in Fig. 1 of the drawings, having their outer ends seated between the raking teeth 3 of the rake head 2. The cross brace 12 has an upstanding U-shaped member 14 secured thereto, the legs of which are positioned upon opposite sides of the rod 4. The U-shaped member 14 forms a guide for guiding the downward movement of the tines 11, and the wrist or vertex 15 of the same, forms means for limiting the downward movement of the tines.

The upper attached ends 8 of the plates or bars 6 and 7 have contracting spiral spring 15' secured thereto. The spring 15' is also connected to the handle 1 of the rake, as is shown at 16, and tends to hold the tines 11 in an upward position, at all times, and to automatically return the tines to an upward position after they have been drawn downwardly by a manual pull upon the flexible member 17. The flexible member 17 is connected to the lower ends of the bars 6 and 7 and to the head 9, and it extends forwardly therefrom, along the handle 1, having its end remote from the end which is connected to the lever 5, connected to the handle 1, as is shown at 18. When the flexible member 17 is pulled in a direction indicated by the arrow A in the drawings, it will rock the lever 5, and move the outer ends of the tines 11 downwardly, between the teeth 3, removing leaves, grass or like articles which may be clinging to the teeth. Immediately upon the release of the flexible member 17, the spiral spring 15′ will act for returning the tines to their upper position, as is shown in Fig. 2.

In reducing the invention to practice, certain minor features of construction, combination, and arrangement of parts may necessitate alteration, to which the patentee is entitled, provided such alterations are comprehended within the scope of what is claimed.

What is claimed is:—

In a rake structure, a rake handle, a rake head having a plurality of depending spaced rake teeth carried thereby, a lever pivotally connected to said handle, a head secured to the lower end of said lever, a plurality of tines carried by said head and extending outwardly therefrom, said tines having their outermost ends positioned between the rake teeth of said head, a spiral spring connected to the upper end of said lever and to said handle for normally holding said tines in an upward position, a flexible member connected to the lower end of said lever and said head, said flexible member being also connected to said handle and adapted for rocking said lever upon a pull upon the flexible member for moving said tines downwardly between said teeth, a U-shaped member carried by said tines and extending over said handle for limiting the downward movement of said tines.

In testimony whereof I affix my signature in presence of two witnesses.

ENOS M. CLOUGH.

Witnesses:
ARCHILLE J. CLEMENT,
CHARLES L. PULSIFER.